United States Patent
Eklund

[15] 3,640,591
[45] Feb. 8, 1972

[54] ROLLING CONTACT BEARING HAVING TEMPERATURE COMPENSATION

[72] Inventor: Phillip R. Eklund, Dayton, Ohio
[73] Assignee: The United States of America as represented by the Secretary of the Air Force
[22] Filed: Mar. 4, 1970
[21] Appl. No.: 16,510

[52] U.S. Cl. ........................................................ 308/184
[51] Int. Cl. .............................................................. F16c 27/00
[58] Field of Search ..................................................... 308/184

[56] References Cited

UNITED STATES PATENTS

| | | | |
|---|---|---|---|
| 2,028,964 | 1/1936 | Annen | 308/184 |
| 3,512,856 | 5/1970 | Robinson | 308/184 |
| 3,404,925 | 10/1968 | Bailey | 308/184 |

FOREIGN PATENTS OR APPLICATIONS

| | | | |
|---|---|---|---|
| 408,283 | 1/1910 | France | 308/184 |

Primary Examiner—Edgar W. Geoghegan
Assistant Examiner—Frank Susko
Attorney—Harry A. Herbert, Jr. and Arthur R. Parker

[57] ABSTRACT

A bearing assembly including a rolling contact bearing member, and a raceway structure incorporating a temperature-compensating flexure-type rib arrangement for providing immediate bearing support to, and resiliently resisting excessive thermal expansion of, the bearing member to thereby counteract and inhibit spalling of the bearing components normally resulting from the excessive thermal expansion.

3 Claims, 6 Drawing Figures

INVENTOR.
PHILLIP R. EKLUND
BY Harry A. Herbert Jr
ATTORNEY
Arthur R. Parker
AGENT

PATENTED FEB 8 1972

INVENTOR.
PHILLIP R. EKLUND
BY Harry A. Herbert Jr.
ATTORNEY
Arthur R. Parker
AGENT 3,640,591

ROLLING CONTACT BEARING HAVING TEMPERATURE COMPENSATION

BACKGROUND OF THE INVENTION

The present invention relates generally to the field of bearing technology and, in particular, to an improved antispalling-type of bearing structure.

In the design of various bearing structures, one important problem has involved the premature failure of the bearing due to the phenomenon known as spalling. The latter problem, which is of particular concern in the development of the relatively large azimuth-type bearings for radar applications, results from a differential temperature existing between the various components of the bearing assembly during its operation. This temperature differential causes an excessive expansion of the ball bearing member, for example, relative to the raceway structure in which it is supported, which creates a preload and relatively high stress concentration at the area of contact therebetween. The latter results in a significant spalling action that is the frequent cause of premature failure of the ball bearing member. This failure is in the form of cracks and even the splitting thereof into two segments after only a relatively short period of operation.

In an analysis of the aforementioned bearing failures, it has been calculated that, for an initial radial clearance between the ball member and its supporting raceway structure of the order of 0.005 inch maximum, a temperature differential of only 5° between the bearing components would be sufficient to entirely close the clearance. Therefore, it is self-evident that, for greater temperature differentials, an excessive preloading and high stress concentration may easily occur at the contact areas between the ball bearing member and the raceway structure. Such high stress concentrations are the principal cause of the phenomenon known as fatigue spalling, followed by the previously referred to early or premature bearing failure. However, by using the unique built-in temperature-compensating means of the present invention, to be hereinafter summarized and described in detail, the aforementioned problem of fatigue spalling may be substantially reduced, if not entirely eliminated.

SUMMARY OF THE INVENTION

The present invention consists briefly in the development of an improved bearing assembly having a ball or roller bearing member, and a built-in, flexure groove type of raceway structure for supporting and thereby resiliently compensating for any excessive thermal expansion applied to said ball or roller bearing member. In one form of the invention, a bolted type of bearing assembly is utilized in which a pair of rib members are each bolted on one end thereof to opposite ends of a main support member. In addition, each of said rib members incorporates a flexing rib portion, which portions are in immediate contact with, and collectively receive at least one ball or roller bearing member in resilient, supporting relation therein. Furthermore, each flexing rib portion terminates in an inner end portion that faces inwardly towards each other, and which are disposed with a slight built-in clearance therebetween to thereby form a first, open-ended groove. Moreover, the said inner end portions are also disposed with a precalculated clearance relative to, and thereby effectively forming a second open-ended groove, with the main support member. Thus, any excessive thermal expansion imparted to the ball or roller bearing member is specifically and uniquely provided and is automatically compensated for by the improved flexing rib member of the present invention.

BRIEF DESCRIPTION OF THE DRAWINGS

Other objects, as well as advantages of the invention, will become readily apparent from the following disclosure thereof, taken in connection with the accompanying drawings, in which.

DESCRIPTION OF THE PREFERRED EMBODIMENT

Figure 1:
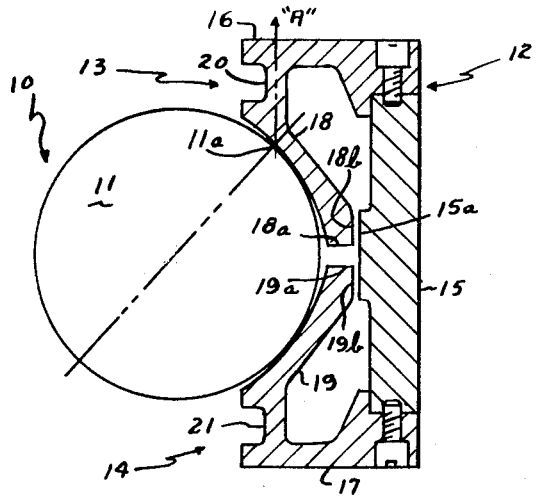
FIGS. 1 and 2 represent partly schematic, cross-sectional views, illustrating details of one form of the novel groove type of flexing rib-raceway structure of the present invention, as applied, respectively, to both bolted and welded types of bearing assemblies.

Referring generally to the drawings and, in particular, to FIG. 1 thereof, the unique bearing assembly of the present invention is indicated generally at 10 as including a ball bearing member 11 and a raceway structure at 12 that may represent the outer race or ring member for supporting the said ball bearing element 11. Naturally, a similar, inner raceway structure would be provided for the other side of the ball member 11; however, this structure has been eliminated for the sake of clarity. Said outer raceway structure 12 may, in the inventive form of FIG. 1, consist of a pair of identical flexing rib members 13 and 14 for providing bearing support to the aforesaid ball bearing member 11 and which may be fabricated from a hardenable steel, and a main upright and vertically disposed support member at 15, which may be fabricated from a low-carbon or soft steel. Each of said rib members 13, 14 includes a first, relatively rigid and straight rib portion, indicated at 16 and 17, each of which is horizontally disposed and may be and 17, each of which is horizontally disposed and may be bolted, as shown, to opposite ends of the said main support member 15, a second, arcuate rib portion, at 18 and 19, each appropriately shaped to collectively receive the aforementioned ball bearing member 11 in bearing-support relation thereto, and a third, relatively straight and vertically disposed, rib portion, indicated at 20 and 21 as being intermediately positioned between, and integrally joined to, the said first and second rib portions 16, 18, and 17, 19, corresponding thereto. The key to this unique and novel arrangement resides in each of the aforesaid third, rib portions 20, 21 being specifically designed with a relative narrow thickness to thereby specifically promote, or provide for, the novel built-in flexing action of the improved ball bearing member-receiving rib members 13 and 14 of the present invention. The actual thickness designed into each of said rib portions 18, 19, of course, depends upon, and may be specifically varied in accordance with, the particular flexing action required for the particular bearing assembly application and load factors present.

To further ensure the positive flexing action built into the above-described rib members 13, 14, each of the aforementioned second, arcuate rib portions 18, 19 have been made to terminate in a flattened inner end portion at 18a and 19a, respectively, which are designed to face inwardly towards each other with a slight clearance disposed therebetween to thereby provide a first, built-in open-ended, grooved portion between said arcuate rib portions 18 and 19. Moreover, the sides of said inner end portions 18a, 19a, of the said arcuate rib portions 18, 19 facing towards the said main upright support member 15 may be similarly flattened, as indicated at 18b and 19b, respectively, and disposed with a precalculated clearance relative to a hublike or centrally disposed, raised surface portion formed on one side of the said main support member 15, as is indicated at the reference numeral 15a. Thus, a second, open-ended grooved portion is thereby formed within the unique raceway structure of the present invention. Naturally, the raised surface potion 15a provides a controlled limit to the flexing action of the rib members 13 and 14. Therefore, with the built-in grooved portions previously described hereinbefore, the new and improved flexing action built into the unique rib members 13, 14 of the present raceway structure is specifically provided for, and thus facilitated.

The arrangement described hereinbefore with specific reference to FIG. 1 is specifically applicable to a thrust load, since the previously referred to third, relatively straight rib portions 20 and 21 have been described and illustrated as being vertically oriented. Thus, a thrust load, as depicted at the contact point at 11a (FIG. 1) between the expanded ball bearing member 11 and the arcuate rib portion 18, for example, should produce a vertical load vector, as indicated at the arrow marked "A," which should pass directly through the said vertical rib portion 20, as shown.

Figure 1A:
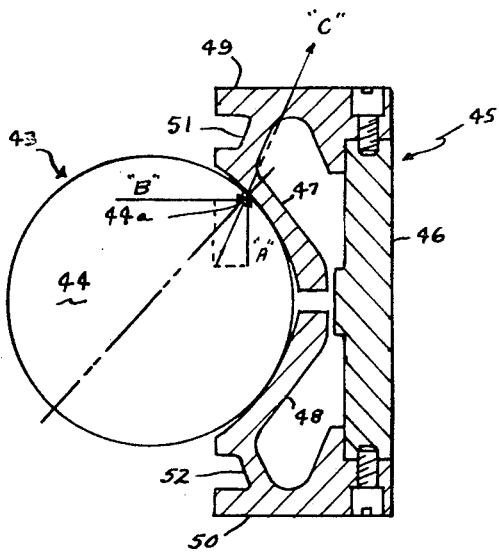
FIG. 1a is a third, partly schematic and cross-sectional view, illustrating a modified type of flexing rib-raceway structure as applied to the bolted type of bearing assembly of FIG. 1.

Where, however, it is desired to specifically compensate for both radial or combined radial/thrust loadings, the bearing design illustrated in FIG. 1a may be utilized. In the aforesaid FIG. 1a, the bearing assembly indicated generally at 43 is illustrated as including a ball bearing member 44, and a unique raceway structure, indicated generally at 45. The latter consists of bolted-type assembly, similar to that of FIG. 1, and includes the main, upright support member 46, and a pair of identical arcuate-shaped, rib members at 47 and 48 specifically configured to receive in bearing support relation thereto the said ball bearing member 44. Said rib members 47 and 48 each include an outer, relatively straight supporting arm member at 49 and 50, which may be bolted, as shown, to opposite ends of the said main support member 46.

Between each of the above-mentioned rib members 47, 48 and supporting-arm members 49, 50 is interconnected a relatively straight rib portion, indicated respectively at 51 and 52 as being integrally jointed between said arm members, 49 and 50, and the rib members 47 and 48. Instead of being vertically disposed to receive and specifically compensate for vertical thrust load vectors as in the inventive forms of FIGS. 1, 2 and 3, the above-described interconnecting rib portions 51 and 52 have each been angularly disposed, or angularly oriented between the said arcuate rib members 47 and 48 and the said outer supporting arm members, 49 and 50, corresponding thereto, in order to specifically compensate for not only a thrust load but for a combined thrust/radial load applied at the contact point 44a and whose vectors are represented at the vectors marked "A" and "B." Thus, the aforementioned angular relation of the interconnecting rib portions 51, 52 thereby collectively allow for a combined radial/thrust loading, the resultant vector of which is denoted by the arrow marked "C," which resultant vector "C" may either directly or nearly directly pass through and therefore be resisted or compensated for by the said interconnecting rib portions 51, 52 nearly in alignment therewith. In the depiction of FIG. 1a, the said resultant vector "C" is shown as nearly passing directly through the said rib portions 51, 52. Of course, the actual position of the resultant vector will, of course, vary somewhat in accordance with the specific point of application of the load.

Figure 2:
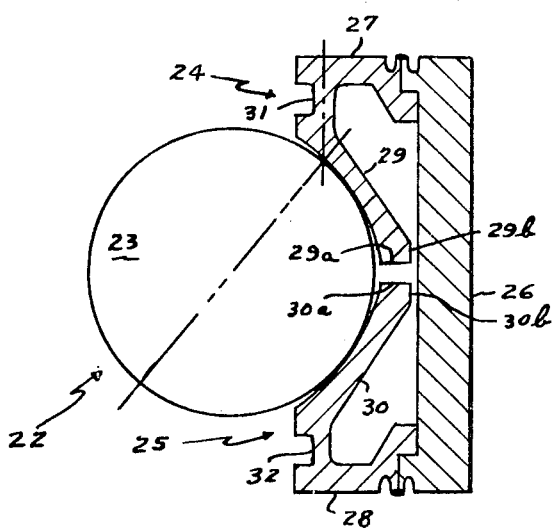

With specific reference to FIG. 2 of the drawings, there is illustrated a welded type of bearing assembly, indicated generally at 22 which, again, includes a ball bearing member at 23 and a novel raceway structure for supporting the said ball bearing member 23 in bearing relation thereto, which raceway structure, as in the inventive form of FIG. 1, includes a pair of identical flexing rib members, indicated generally at 24 and 25, which may be rigidly supported at one end thereof to the main upright support members 26, as by welding thereto as shown. For this purpose, the said rib members 24, 25 may be each provided with a first, relatively straight, horizontally disposed, thickened and therefore rigid rib portion, at 27 and 28, respectively, which are welded, as shown, to opposite ends of the main support member 26, a second, arcuate rib portion, at 29 and 30, and a third, relatively narrow and upright, vertically oriented rib portion, at 31 and 32. Again, as with the bolted bearing assembly of FIG. 1, each of the aforesaid third, rib portions 31, 32, may be designed with a predetermined thickness to thereby provide the degree of flexure needed for a particular bearing application of the said rib members 24 and 25 while the latter are under a preload applied thereto and resulting from the excessive thermal expansion of the ball bearing member 23. In this manner, the automatic temperature compensating means of the invention may be built into the inventive form of FIG. 2. To this end, the aforementioned second, arcuate rib portions 29 and 30 of the pair of rib members 24 and 25 are each equipped with a first, flattened inner end, at 29a and 30a, which are disposed with a slight clearance relative to each other to thereby provide a first groove, and a second, flattened inner end, at 29b and 30b, which are oriented with a built-in clearance relative to one side of the said main support member 26. The only difference between the support member 26 of FIG. 2 and the support member 15 of FIG. 1, other than its welded attachment, resides in the omission therefrom of the hublike or centrally raised surface portion 15a (FIG. 1), which element is unnecessary with the support member 26 (FIG. 2) because of the relatively short length of the first rib portions 27 and 28. Of course, in this case, the side of the main support member 26 provides the same type of limit and therefore control to the flexing action of the rib members 24 and 25, as does the raised surface portion 15a of FIG. 1.

Figure 3:
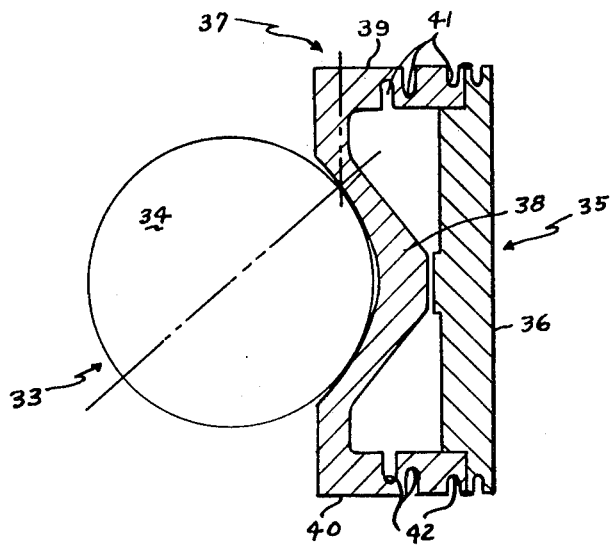
FIG. 3 is another partly schematic and cross-sectional view, illustrating details of a welded type of bearing assembly, in which a further modified type of flexing rib-raceway structure is incorporated.

In FIG. 3, a still further modified form of the present invention is illustrated in the welded type of bearing assembly indicated generally at 33 as including, again, a ball bearing member at 34, and a raceway structure at 35 for providing bearing support for the said ball bearing member 34. Said raceway structure 35 consists of the main upright and vertically oriented support member 36 and unique means, indicated generally at 37, for directly supporting said ball bearing member 34 in bearing relation thereto. As clearly seen in the aforesaid FIG. 3, the bearing support means 37 is uniquely distinguished over its counterpart mechanisms in either FIGS. 1 and 2 in that the said means 37 consists of a single rib member, instead of a pair of identical rib members, as at 16 and 17 (FIG. 1) and/or at 24 and 25 (FIG. 2). The said bearing support means—single rib member 37 consists of a single arcuate rib portion at 38, which directly supports the said ball bearing member 34 in direct bearing relation thereto, and a pair of integral, arm members at 39 and 40 extending from opposite ends of said arcuate rib portion 38 rearwardly away from said ball bearing member 34 to a welded position on opposite sides of the aforesaid main support member 36.

The above-described pair of integral arm members 39 and 40 may be specifically and uniquely designed with a series of cutout portions, as indicated at 41 and 42, or otherwise made semirigid or somewhat flexible, in order to provide an inherent and built-in flexibility or flexure to the previously referred to single arcuate rib portion 38 and this permits the latter element to undergo the requisite flexing action, as taught by the inventive concept of the present invention, to provide an automatic temperature compensation to thereby counteract any excessive thermal expansion imparted to the said ball bearing member 34 as a result of a significant temperature differential existing between the said member 34 and the raceway structure 35.

Figure 4:
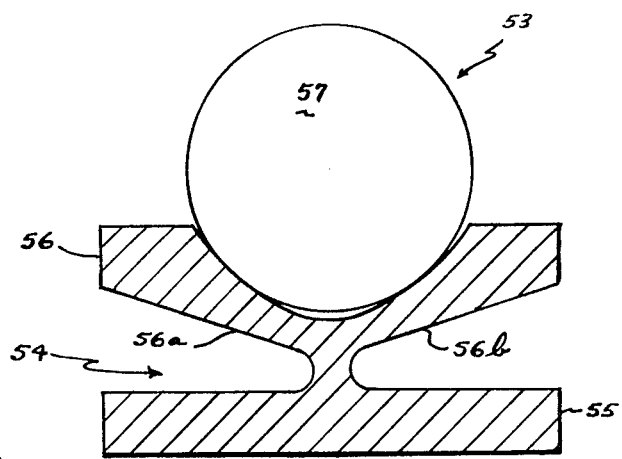
FIGS. 4 and 5 represent additional partly schematic and cross-sectional views, illustrating details of still further modified types of flexing rib-raceway structures of the invention.
Figure 5:
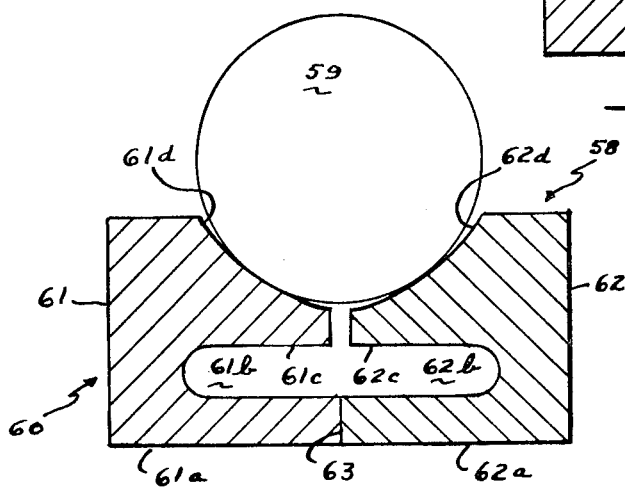

Although the inventive forms of FIGS. 1–3, inclusive, have been developed for particular application to bearings of relatively large sizes and diameters of the order of 12 feet and 3½ inches, respectively, the present invention is also applicable to bearings of smaller diameters in a form, for example, such as that disclosed in FIGS. 4 and 5. The ball bearing members, indicated at 57 and 59 in FIGS. 4 and 5, respectively, and their related unique and yet simplified raceway structures, at 54 and 60, respectively, have been illustrated in enlarged form for the sake of clarity. In FIG. 4, for example, the inventive bearing assembly is indicated generally at 53 as including the aforesaid raceway structure, indicated generally at 54, which consists of a single integral unit including a main support member portion at 55 and a rib member portion at 56 integrally joined to said member portion 55 and utilized to support the ball bearing member 57 in bearing relation thereto.

Naturally, in accordance with the teaching of the present invention, the areas of the said rib member portion 56, indicated generally at 56a and 56b, may be made of a reduced diameter to thereby ensure that the said rib member portion 56 will flex a given amount under a predetermined preload and relatively high stress concentration resulting from the thermal expansion of the ball bearing member 53. In the modification of FIG. 5, another form of the inventive temperature-compensating bearing assembly is shown generally at 58 as including, again, a ball bearing member at 59, and a novel raceway structure, indicated generally at 60. Instead of a single structure, as in FIG. 4, the raceway structure 60 is illustrated as consisting of a pair of identical ball bearing member-supporting members, at 61 and 62, which may be joined together, as by welding, along the welding joint line indicated generally at the reference numeral 63. As clearly seen in the aforesaid FIG. 5, each of said raceway structure-supporting members 61, 62 incorporates an outer, flattened side portion at 61a and 62a, respectively, that are joined together along the said welding joint at 63 to thereby form a continuous surface extending therebetween. In addition, said raceway structure-supporting members 61, 62 each may be provided with a relatively elongated, cutout portion at 61b and 62b, respectively, to thereby provide for the necessary flexing action of a pair of flexing supporting-arm or rib members at 61c and 62c, respectively. Rib members 61c, 62c are each uniquely configured and made with an arcuate-shaped upper surface at 61d and 62d, respectively, to thereby receive in bearing support relation thereto the said ball bearing member 59. Moreover, each of said rib members 61c, 62c, extend inwardly towards each other to a relatively reduced diameter portion, as clearly seen, and to terminate in a slightly spaced-apart relation to each other to thereby provide for the inventive flexing action under a load imposed thereon by the excessive thermal expansion of the said ball bearing member 59.

Although the foregoing disclosure of the invention is made with specific reference to a ball bearing assembly, it is to be understood that the unique and improved temperature-compensating means may be as easily applied to the roller bearing configuration and that other modifications thereof may be made without departing from the true spirit or scope of the invention.

I claim:

1. In a bearing assembly having at least one antifriction, rolling contact bearing member; and a raceway structure comprising both inner and outer race members for supporting said antifriction bearing member; each of said race members including, and combined with, a temperature-compensating mechanism built into and forming a substantially integral part of said raceway structure and comprising; a first, substantially rigid, main upright support portion disposed in relatively remote relation to, and thereby indirectly supporting said antifriction bearing member; a second, direct-antifriction bearing member-support portion including first, arcuate-shaped inner disposed surface means arranged in spaced-apart and relatively remote relation to, said first, main support portion and in direct supporting contact with said antifriction bearing member, and second, outwardly disposed surface means backwardly curved to a centrally disposed, relatively flat surface portion oriented at a predetermined clearance with the inner surface of said first main, support portion to thereby positively limit any flexure applied to said direct-antifriction bearing member-support portion by the thermal expansion of said bearing member; and a third, intermediately positioned and substantially resilient, antifriction, bearing member-support portion integrally joined between, and extending in substantially projecting relation from, said first, main support portion to a yieldable attachment with said second, direct-antifriction bearing member-support portion to thereby flexibly support both of said second-named support portion and the antifriction bearing member supported thereby, and thus controllably resist and automatically compensate for the expansion of the antifriction bearing member resulting from a temperature differential existing in, and during operation of the various bearing components; said second, direct-antifriction bearing member-support portion comprising a pair of arcuate-shaped members each consisting of a separate flexing rib member terminating in an inner end portion facing inwardly towards each other.

2. In a bearing assembly as in claim 1, wherein the inner end portion of each of said flexing rib members facing towards each other are arranged both with a slight clearance therebetween to thereby provide a first groove portion, and at a predetermined distance from said main support means to thereby provide a second groove portion at right angles to said first groove portion to simultaneously both ensure a predetermined flexure and a positive controllable limit to the movement of each of said rib members resulting from the flexing action thereof and thus retaining the minimum inherent strength required for the said bearing assembly while simultaneously ensuring significant relief of any stress concentrations.

3. In a bearing assembly as in claim 1, wherein the resilient, third, antifriction bearing-support portion consists of a pair of interconnecting flexing rib member-support elements integrally joined between, and yieldably mounting the outer end portions of each of said flexing rib members at a specific orientation relative to the vertical and approximately corresponding to an angular position predetermined to be in substantial alignment with, and thus controllably resisting and absorbing the resultant forces of combined thrust-radial loads predicted for, and being applied to, or by said antifriction bearing member.

* * * * *